United States Patent
Cheng et al.

(10) Patent No.: US 7,533,061 B1
(45) Date of Patent: May 12, 2009

(54) DELIVERING MEDIA FILES TO CONSUMER DEVICES

(75) Inventors: Michael Cheng, Bellevue, WA (US); Jason McCartney, Redmond, WA (US)

(73) Assignee: Loudeye Corp., Seattle, WA (US)

( * ) Notice: Subject to any disclaimer, the term of this patent is extended or adjusted under 35 U.S.C. 154(b) by 0 days.

(21) Appl. No.: 11/333,942

(22) Filed: Jan. 18, 2006

(51) Int. Cl.
*G06F 17/60* (2006.01)
(52) U.S. Cl. .............................. 705/50; 705/51; 705/57
(58) Field of Classification Search ................... 705/51, 705/57, 50
See application file for complete search history.

(56) References Cited

U.S. PATENT DOCUMENTS

2005/0220296 A1* 10/2005 Kawell et al. ................. 380/1
2005/0273438 A1* 12/2005 Yen et al. ...................... 705/59

FOREIGN PATENT DOCUMENTS

JP 2008042928 A * 2/2008

OTHER PUBLICATIONS

"Creating Fat Binary Programs," Mar. 11, 1997, downloaded Jan. 10, 2007, from http://developer.apple.com/documentation/mac/runtimehtml/RTArch-87.htm, 1 page.
"Verizon Introduces V CAST Music Download Service for Cell Phones," Digitalmediawire, Jan. 5, 2006, downloaded Jan. 10, 2007, from http://www.dmwmedia.com/news/2006/01/05/verizon-introduces-v-cast-music-download-service-for cell-phones, 1 page.

* cited by examiner

*Primary Examiner*—Pierre E Elisca
(74) *Attorney, Agent, or Firm*—Alston & Bird, LLP (57) ABSTRACT

Techniques are described for delivering copies of digital media items to consumers, such as to in some situations provide to a consumer a single file with multiple distinct copies of a digital media item for use by multiple distinct devices of the consumer, with each copy differing from the others in one or more ways. Such single files may be of use, for example, in situations in which consumers each have multiple devices (e.g., of multiple distinct types, such as a personal computer, a cellular telephone with capabilities to playback digital audio and/or video items, other types of portable digital media presentation devices, etc.) that the consumer desires to use as a playback or other presentation device for digital media items (e.g., digital media items downloaded or otherwise obtained from an online media store or other provider of digital media items).

42 Claims, 5 Drawing Sheets

DELIVERING MEDIA FILES TO CONSUMER DEVICES

TECHNICAL FIELD

The following disclosure relates generally to interactions with consumer devices, such as interactions involving online media stores that provide to a consumer a single file with multiple distinct copies of a digital media item for use by multiple distinct devices of the consumer.

BACKGROUND

Various types of computing devices are increasingly being used to communicate and to access remote information, such as via the World Wide Web (the "Web") over the Internet and via communication networks of information service providers (e.g., a private telephone network of a telephone service provider, such as a cell phone network or a landline network, or a cable network of a cable system operator), including various types of personal digital media devices (including, for example, personal computers, cellular telephones and other types of handheld devices, specialized digital media player or presentation devices, an Internet-enabled television device, etc.) and other devices. The Web has also become a medium used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). After receiving an order for one or more items, a Web merchant then fulfills the order by providing the ordered items to the indicated recipient. Some product items may be available to be delivered electronically to a recipient (e.g., music files streamed, downloaded or otherwise sent over the Internet), while other product items (e.g., paperback books) may instead be delivered through physical distribution channels (e.g., shipment via a governmental postal service or private common carrier). Similarly, some service items may be provided electronically (e.g., providing email service), while others may be provided physically (e.g., performing cleaning services at the purchaser's house).

One area of commerce of increasing popularity involves providing various types of content to consumers in digital form, with the digital content then able to be used by the consumers on consumer devices that provide corresponding capabilities. For example, consumers are increasingly purchasing or otherwise obtaining (e.g., through a subscription or "rental" service) digital music and other digital media (e.g., MP3 song files, Windows Media Access files, digital audio book, digital music videos, etc.), such as for download and later playback to the consumer on one or more appropriate presentation devices (e.g., a personal computer, a portable digital music player device having flash memory and/or a local hard disk, etc.). Digital music files and other digital media files may be permanently downloaded by consumers to personal computers from one or more online music services or stores (e.g., Cingular Wireless' mMode Music Store, Apple Computer's iTunes Music Store, RealNetworks' RealPlayer Music Store, Napster.com, etc.) or otherwise stored on the personal computers (e.g., by copying the music from a music CD or DVD loaded in an appropriate drive of the computer), and may then optionally be loaded onto digital music player devices or other digital media player devices by the consumers (e.g., via a physical cable between a player device and a personal computer). For some fee-based online music services, each music file may be individually purchased for a specified fee and then played by the consumer as desired (e.g., on the computer or other personal digital media device to which the file was downloaded or streamed, or on other portable player devices, and without restrictions on the number of times or the amount of time for which the music file may be accessed). For other fee-based online music services, a consumer may access music files using a subscription to the music service that allows the consumer to stream and/or conditionally download and use a pre-set or unlimited number of music files, but with the music files usable only under specified conditions, such as only while the subscription continues to be valid, and in some situations only on specified types of devices that allow the continued subscription validity to be verified (e.g., devices using Microsoft Corporation's Janus Windows Media DRM ("Digital Rights Management") 10 technology). In a similar manner, consumers may load and use various other types of non-executable digital media (e.g., videos, photos and other images, e-books and other textual information, etc.) on corresponding digital media player devices (e.g., digital photo display devices, digital video player devices, e-book reader devices, etc.).

Although consumers' ability to interact with online media stores in order to download and use various types of digital media provides a variety of benefits, various problems exist. For example, some problems result from consumers who use multiple distinct devices (e.g., a mobile device and a personal computer) for interacting with online media stores and/or for presenting digital media items, such as problems in distributing digital media items to the various devices, as well as in coordinating other information and functionality provided to the consumers' devices. Moreover, various problems can result due to limited capabilities of some devices that such consumers may use as part of the interactions, such as mobile devices with wireless communications capabilities (e.g., a cellular telephone, a Wi-Fi-enabled handheld computer, a laptop, etc.) that may have limited communication capabilities (e.g., slow connection speeds, intermittent connections, etc.), as well as other types of limited capabilities such as limited display capabilities (e.g., a small display size, limited abilities to display certain resolutions and colors, limited abilities to display certain types of information, etc.), limited DRM capabilities (e.g., based on authorizations and/or permissions that restrict wireless or over-the-air delivery of selected digital media items), and/or limited capabilities for playing or otherwise presenting digital media items (e.g., an inability to play streamed or otherwise sent digital music files). Such limited capabilities of such mobile devices may make it difficult for consumers to download and present digital media items, as well as to discover (e.g., search for and/or browse for) such items and to purchase or otherwise order such items.

Accordingly, it would be beneficial to provide capabilities to facilitate performing interactions between online media stores and consumers' devices in such a manner as to minimize such difficulties, and to perform delivery of digital media items to consumer devices in manners that provide

DETAILED DESCRIPTION

Techniques are described for performing various interactions between online media stores and consumers' devices, such as to facilitate transactions between the consumers and the online media stores (e.g., the discovery, purchase and download of digital media files). In some embodiments, at least some consumers each have multiple devices that the consumer desires to use as a playback or other presentation device for digital media items (e.g., digital media items downloaded or otherwise obtained from an online media store or other provider of digital media items), and the interactions with consumers' devices are performed so as to coordinate information and actions involving the multiple distinct devices of a consumer. For example, in some embodiments an online digital media item provider acts so as to provide dual-delivery of a selected digital media item to two distinct devices of a consumer (e.g., a personal computer and cellular telephone) in response to a single consumer purchase (e.g., for a single price) or other action, such as via a single file provided to one of the two devices that includes two distinct copies of the digital media item. More generally, in some embodiments the described techniques allow multi-device delivery of a digital media item to a consumer such that multiple distinct copies of the digital media item are provided to multiple distinct devices of the consumer via a single file, with each copy differing from the others in one or more ways. The described techniques may in some embodiments be employed by an online provider of digital media files (e.g., an online media store) and/or by a back-end transaction platform that supports one or more such online providers, such as for one or more online music stores or other services to employ the techniques on behalf of consumer devices.

Thus, interactions with consumers' devices are performed so as to enable a consumer (or other device user) to obtain multiple distinct copies of a digital media item for use with multiple distinct devices of the consumer, such as in some embodiments via a single file that is downloaded to a device of the consumer or otherwise provided to the consumer. The multiple devices of a consumer may, for example, be of multiple distinct types (e.g., a personal computer, a cellular telephone with capabilities to playback digital audio and/or video items, other types of portable digital media presentation devices, etc.), and may each possess distinct capabilities for playing or otherwise presenting digital media items (e.g., based on software and/or hardware available to the devices). For example, distinct devices of a consumer may support different file types with different data encodings and formats, different bit rates or sample rates, different DRM ("Digital Rights Management") technologies, different compression schemes, etc.

Accordingly, when an online media store or other provider of digital media items performs a multi-device delivery of a selected digital media item so as to provide multiple distinct copies of the item for use by multiple devices of the consumer, each copy may be a distinct version of the digital media item (e.g., in different formats or encodings; in different file types and/or sizes; using different bit rates or sample rates; using different DRM technologies; using different compression schemes; with different content, such as cover art associated with a digital music album item or other types of metadata associated with the digital music; etc.) for use by each of one or more of the various devices. In addition, the multiple copies of a digital media item may be created and stored in various ways in one or more files, as discussed in greater detail below. Moreover, while in some embodiments a single file is provided to a consumer that includes all of the multiple distinct copies for use by a consumer's various devices, in other embodiments multiple files may instead be provided to one or more devices of a consumer as part of a multi-device delivery of a selected digital media file (e.g., with each file containing one or more copies of the digital media item), whether simultaneously or at different times, as well as optionally using different networks and/or mechanisms for providing the digital media items to the devices (e.g., streaming versus another form of download). The digital media item provider may also perform the multi-device delivery in various ways in various embodiments, as discussed in greater detail below, including by generating a file for a digital media item dynamically in response to a request by a consumer (e.g., by determining the multiple distinct copies that are appropriate for the devices of the consumer and generating a single file to include those copies). The described multi-device delivery techniques provide various benefits to both the consumer (e.g., avoiding difficulties associated with distributing multiple distinct files to distinct devices of the consumer, such as the consumer needing to initiate multiple distinct downloads) and the digital media item provider (e.g., by minimizing storage needed to store various separate files for each of multiple distinct copies of a digital media item).

Figure 1:
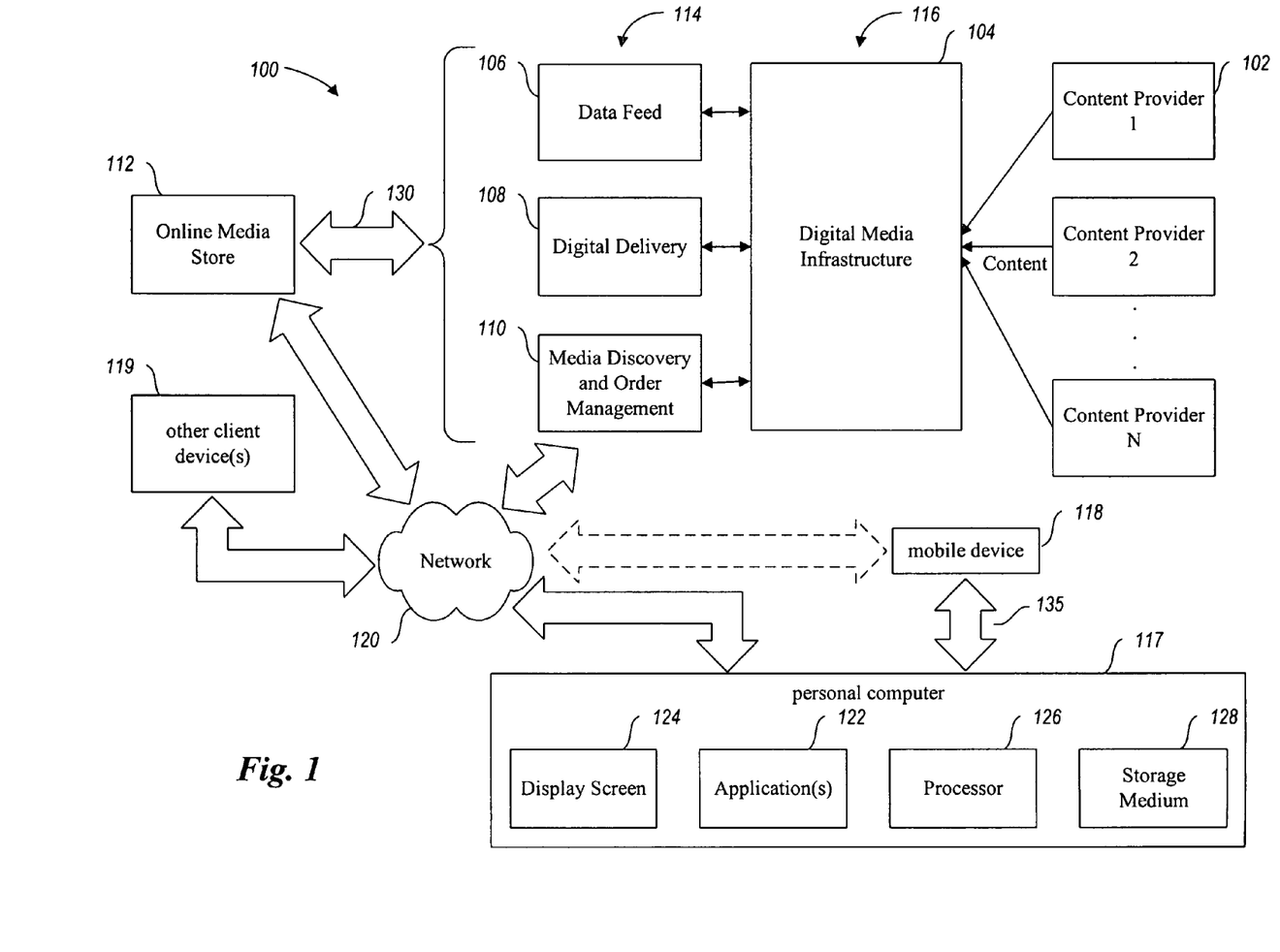
FIG. 1 is a network diagram illustrating various interactions between online media stores and consumers' mobile and other devices.

FIG. 1 illustrates an example of one embodiment in which various of the techniques may be used, and in particular illustrates various participants interacting in order to provide and/or receive digital media files, such as for one or more online media stores 112 (e.g., Web-based digital music or other digital media stores) to interact with one or more consumer users over the Internet or other network 120 to enable them to obtain digital media files (e.g., DRM-protected digital music files). In this example, each of the one or more stores may be operated by a distinct company acting as a customer (or "affiliate") of an organization (not shown) that provides back-end capabilities to download or otherwise supply digital media files. In particular, FIG. 1 illustrates an example embodiment of a system 100 for providing a digital media platform that supports the one or more online media stores, although it is appreciated that the system 100 shown in FIG. 1 is merely one possible example of such a system, and that in other embodiments one or more online media stores may operate without using such a back-end digital media platform. While not illustrated here, the system 100 may include one or more computing systems (e.g., the computing system 300 of FIG. 3, such as to provide some or all of the digital media delivery functionality 108).

In this example embodiment, the digital media platform includes two subsystems, those being a customer-facing subsystem 114 and a non-customer-facing subsystem 116. The customer-facing subsystem includes a data feed component 106, a digital media delivery component 108, and a digital media discovery and order management component 110 in this example, although in other embodiments other components may be present and functionality of components may be distributed in other manners (e.g., the digital media discovery and order management component 110 may be replaced with a digital media discovery component and a separate order management component). The non-customer-facing subsystem 116 includes a digital media infrastructure 104 in this example, which provides data and services usable by the components of the customer-facing subsystem 114, although in other embodiments the digital media infrastructure may include one or more additional components.

One or more content providers 102 provide content to the digital media infrastructure 104 in this example, such as, for example, songs, audio or video clips, movies, text and images, advertisements, games, news, other multimedia-related content, associated metadata, or other content. The digital media infrastructure can then use the provided content as part of providing various internal services that support the customer-facing subsystem 114. For example, in the illustrated embodiment the digital media infrastructure can provide one or more of digital media encoding functionality, metadata ingestion functionality, graphics, samples, functionality to provide digital rights management protection of content, and other capabilities that are described in greater detail elsewhere.

In this example, the digital media infrastructure communicates with the data feed, digital media delivery, and digital media discovery and order management components, which in turn communicate with one or more customer online media stores 112 which are using those components. As discussed in greater detail below, some or all of the components may be integrated with each of some or all of the customer online media stores, or instead some or all of the components may instead be separate from some or all of the customer online media stores.

The data feed component operates in this example to provide various types of data (e.g., media metadata, media download location, media license location, graphics, media sample location, and/or rights information) to the customer online media stores that are using the data feed component. The digital media delivery component operates in this example to provide media download or streaming services, license acquisition services, and media authorization services to the customer online media stores that are using the digital media delivery component. The digital media discovery and order management component operates in this example to, for the media discovery aspect, use data provided from the digital media infrastructure to enable browsing and searching of media content via the customer online media stores that are using the digital media discovery and order management component, and to, for the order management aspect, provide shopping carts, wish lists, order tracking, and other capabilities for the customer online media stores that are using the digital media discovery and order management component.

In this example, each customer online media store is operated by a merchant or other entity that is different than the entity operating the digital media platform, although in other embodiments a single party can operate both the digital media platform and one or more of the customer online media stores. Each customer online media store provides a Web site-based user interface in this example that is accessible by at least one consumer client device, such as a personal computer device 117 (e.g., via a wired connection to the network 120) and/or one or more other client devices 119. In addition, if one or more mobile client devices 118 include capabilities to communicate over the network (e.g., via a wireless connection), such mobile devices may similarly access one or more interfaces of one or more customer online media stores if the wireless connection is currently available, whether instead of or in addition to the client devices 117 and 119. A consumer user (not shown) of a client device can then use Web pages of the Web site to browse through product offerings, perform searches, place orders, etc. The client devices in this example also may communicate via the network 120 with one or more components of the digital media platform, such as to communicate with the digital media delivery component to obtain digital media product downloads and/or streams, licenses, etc. Such client devices may include, for example, any personal digital media device (including, for example, personal computers, other computers, network devices, PDAs, cellular telephones, cordless phones, devices with walkie-talkie and other push-to-talk capabilities, pagers, electronic organizers, Internet appliances, television-based systems (e.g., using set-top boxes and/or personal/digital video recorders), various other consumer products that include appropriate inter-communication and computing capabilities, etc.) or other computing device that includes appropriate communication capabilities to allow interactions with an online media store and/or capabilities to playback or otherwise present digital media items that are downloaded or otherwise sent based on interactions with an online media store.

The personal computer client devices 117 in this example each include an executing application program 122 (e.g., a Web browser) that can communicate with the various customer online media stores via the network 120 to access and display on a display screen 124 a user interface and other information provided by the customer online media stores, such as to purchase a digital media item and initiate a download of the digital media item, and one or more other application programs 122 may also be present to provide other types of functionality (e.g., a digital media player, or a client-side functional component to facilitate multi-device delivery of a digital media item, as discussed in greater detail elsewhere). Each client device also includes one or more processors 126 and machine-readable storage media 128 in this example, such as to execute and store the application program 122, respectively. Moreover, the storage medium 128 can locally store content, such as content obtained via the customer online media stores or from some other network source. In addition, in this example the personal computer device 117 is shown with a direct connection 135 to one or more mobile devices 118, such as via a local docking port or other wired connection or instead via a local wireless connection (e.g., a local area network, such as a WI-FI network, or a direct connection, such as via Bluetooth)—such a direct connection may be used for various purposes, including in some embodiments to facilitate multi-device delivery of a digital media item by transferring a copy of the item to the mobile device 118 from a single file on the personal computer that contains multiple copies of the item, not shown. For the sake of simplicity and brevity, other components of the client devices 117 are not shown or described further. While not illustrated here, the client devices 118 and 119 may each similarly have some or all such components, and some personal computer client devices may instead lack some or all such components.

Furthermore, in some embodiments one or more interfaces 130 may be provided by the digital media platform to allow the customer online media stores to access the components of the digital media platform, such as via one or more APIs ("application program interfaces") based on the use of Web service interaction mechanisms or other inter-communication mechanisms. Web services allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocation interfaces (e.g., using XML format), and UDDI ("Universal Description, Discovery, and Integration service") for discovery of available services.

In some embodiments one or more security layers (not shown) may also be provided between the customer online media stores (and/or client devices) and the digital media platform. The security layers may use one or more of various techniques (e.g., credentials, secure communication channels, passwords, encryption, etc.) to ensure that a particular customer online media store can access only data and services for which that store is authorized (e.g., data pertaining to that store, and not to other stores and/or to digital media platform components and services that are not in use by the store). The security layer may also operate to ensure that consumers or other users at the client devices 118 and/or 119 are able to access and use only authorized content and/or services from the digital media platform.

Additional details regarding an example of such a digital media platform and techniques provided by such a digital media platform are included in U.S. application Ser. No. 11/238,917, entitled "Online Digital Media Platform" and filed Sep. 28, 2005, in U.S. application Ser. No. 11/264,492, entitled "Interactions Between Online Media Stores And Mobile Devices" and filed Oct. 31, 2005, and in U.S. application Ser. No. 11/238,481, entitled "Dynamically Modifying Protected Digital Media Files" and filed Sep. 28, 2005, each of which is hereby incorporated by reference in its entirety After a consumer receives a streamed or otherwise downloaded copy of a selected digital media file on a personal digital media device and/or other client computing device of the consumer, such as directly from an online media store or instead from the digital media platform, the consumer may eventually or immediately opt to playback or otherwise present the digital media file on that or another personal digital media device or other client computing device of the consumer. At that time, media presentation software on that personal digital media device or other computing device of the consumer that supports the protection scheme and type of file (e.g., a digital music player software application 122, such as Microsoft's Windows Media Player software) will initiate such playback or presentation, including initiating procurement of a license for the digital media file if needed and not already available.

In addition, as previously noted, in some embodiments a selected digital media item may be provided to a personal computer 117 (or other client device) via a single file for use in multi-device delivery to multiple devices of a consumer, such as from an online media store and/or the digital media platform and for use by the personal computer and/or one or more mobile devices 118 and/or one or more other client devices 119. If so, such a single file (not shown) may be stored on the personal computer 117 (e.g., on the storage medium 128) and used to provide copies of the digital medium item to each of one or more other devices. In some embodiments, a distribution facilitator component (not shown) may execute on the personal computer to facilitate the distribution of the copies, such as an executable program (e.g., an applet) that is downloaded to the personal computer from an online media store or from the digital media platform (whether prior to the delivery of the single file or in a manner together with the single file), or that is otherwise provided to or installed on the personal computer. Such a distribution facilitator component may, for example, assist in transferring a copy of the selected digital media item to a mobile device by extracting a copy of the item from the single file that is appropriate for the mobile device, with the extracted copy then provided to that mobile device (e.g., via the connection 135). This process may similarly be performed for one or more other devices 117, 118 and/or 119. In addition, in some embodiments the distribution facilitator component may further assist in providing a usable copy of the selected digital media item to the personal computer by extracting such a copy from the single file or otherwise manipulating the single file to provide that copy, while in other embodiments the single file may be usable by the personal computer (e.g., by a media player program on the personal computer) and/or one or more other client devices without any manipulation or any assistance from the distribution facilitator component. Additional details regarding creation and use of such a single file are discussed with respect to FIG. 2 and elsewhere.

As previously noted, the described techniques may be used with a variety of types of digital media content files and can be used with a variety of types of DRM and other types of file protection schemes. For example, the digital media files may include digital music and digital audio books and other audio files in various formats (e.g., MP3 files, WMA files, RealAudio files, AAC (or "Advanced Audio Coding") files, FLAC (or "Free Lossless Audio Codec") files, Ogg Vorbis files, etc.), digital photos and other image files in various formats (e.g., GIF, JPEG, etc.), digital video in various formats (e.g., MPEG-1, MPEG-2, MPEG-4, WMV (or "Windows Media Video"), RealVideo, H.263, H.264, H.26L, etc.), e-books and other textual information in various formats, etc. In addition, such techniques may be used with various types of protection schemes that include Microsoft Corporation's Windows Media DRM technology, Apple Computer's FairPlay DRM, RealNetworks' Helix DRM and Harmony technology, Open Mobile Alliance's OMA DRM, Sony's OpenMG DRM technology, etc., with encrypted files (e.g., encrypted using public key encryption or passwords), and with various other copy protection and/or access protection technologies.

For illustrative purposes, some embodiments are described below in which specific types of interactions and functionality are provided by specific entities (e.g., an online media store and/or digital media platform) in specific manners, and are used by various specific types of consumers' client devices in specific ways. However, the techniques can be used in a wide variety of other situations, and the invention is not limited to the specific illustrative details discussed. In addition, as used generally in this document, "multimedia" or "digital media content" generally includes music and other audio information (whether stored, streamed or otherwise downloaded or delivered), television programs and movies and other video information (whether stored, such as in a file, or streamed or otherwise downloaded or delivered), photos and other images, presentations, video/teleconferences, videogames, Internet Web pages and other data, and other similar audio or video content or other multimedia content.

Figure 2:
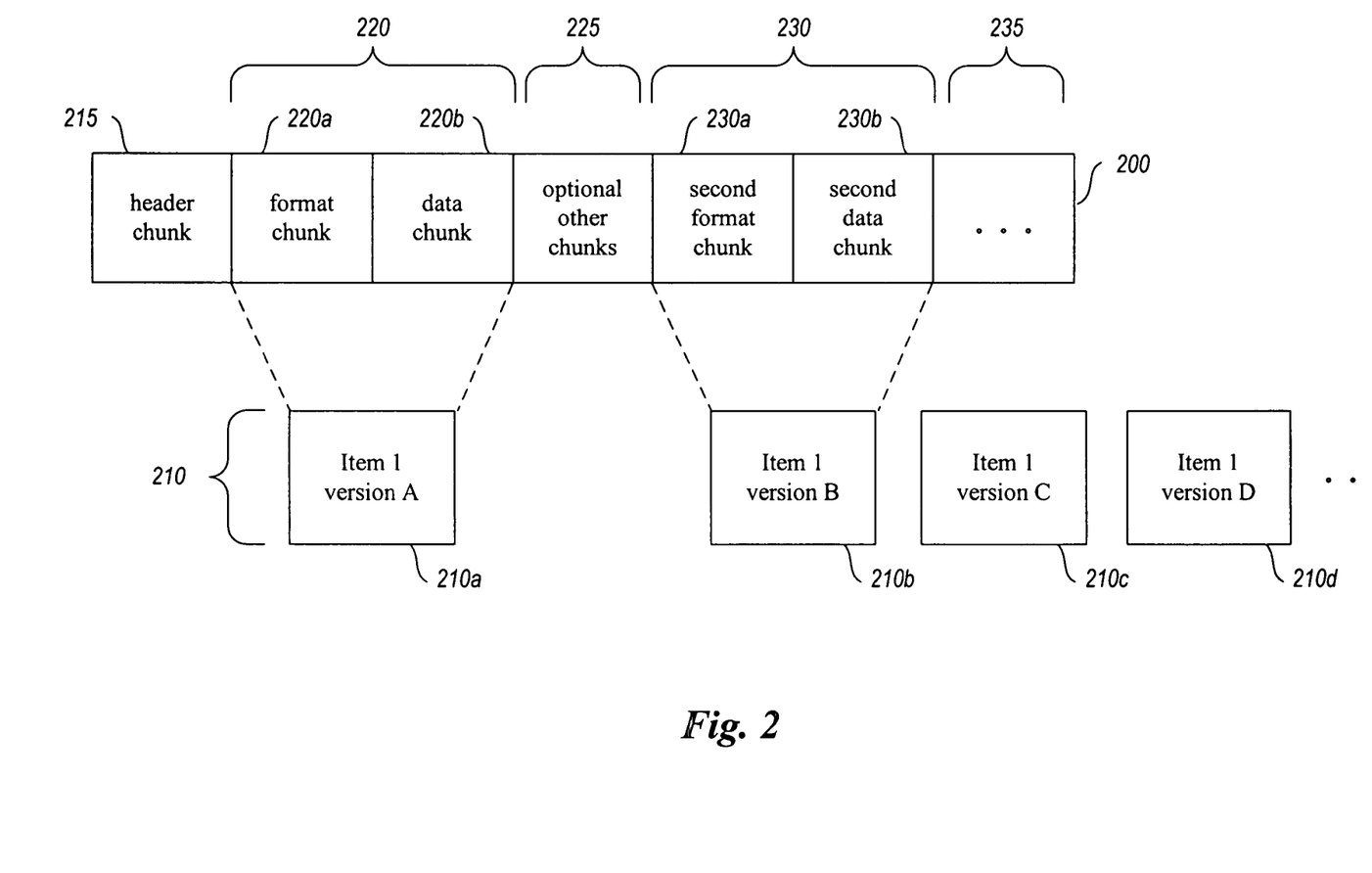
FIG. 2 illustrates an example of a single file for use in multi-device delivery of a digital media item.

FIG. 2 illustrates an example of a single file for use in multi-device delivery of a digital media item. In this example, the illustrated file 200 uses one of several types of file formats that allow data to be stored inside a file in tagged chunks, such as WAV, RIFF ("Resource Interchange File Format"), WMA ("Windows Media Audio"), and ASF ("Advanced Streaming Format") file formats. Such file formats typically have one or more required chunks of data, such as at the beginning of the file, but may also optionally have other chunks of data that media player software may be able to use but that may be ignored if not recognized.

In this example, the illustrated file 200 is a WAV file that is generated for use in performing multi-device delivery of a selected digital media item to a consumer. The digital media item in this example is Item 1, and the digital media platform stores several distinct versions 210 of the item, such as versions varying based on sample rate, DRM technology used, etc. The single file generation process determines multiple versions of Item 1 that are to be included in the single file being generated, such as by receiving explicit indications of those versions, or instead receiving information about the multiple client devices of the consumer and determining Item 1 versions that are appropriate for those client devices. In this example, Item 1 versions 210a and 210b are identified and used with the file 200, although in other embodiments more than two versions may be used, and other combinations of versions may be used. In addition, in this example the file 200 is dynamically generated for the consumer (e.g., at a time of a request from the consumer for Item 1), although in other embodiments one or more such files (e.g., to include different combinations of versions of Item 1) could be created at other times and/or could be used with multiple distinct consumers.

In this example, the WAV file 200 begins with a header chunk 215, which includes various data that is not shown, such as the chunk tag "RIFF", followed by the length of the file in bytes, followed by the format indicator "WAVE" to reflect the format for the following data. As will be appreciated, the length of the file may vary based on the particular Item 1 version copies that are included in the file being generated. Since the file is in the "WAVE" (or WAV) format, at least two additional chunks are required for the file format, those being format and data chunks. In this example, the format chunk 220a includes various data that is not shown, such as a "fmt" tag, an indication of the length of the format chunk in bytes, and various information about the encoding of the data in the following "data" chunk, such as the audio format used (e.g., PCM, or pulse-code modulation), number of channels (e.g., 1 for mono, 2 for stereo, etc.), sample rate, average bytes per second, bytes per sample slice, bits per sample, and optionally an indication of additional format bytes that follow. The following data chunk 220b also includes various data that is not shown, such as a "data" tag, an indication of the length of the data chunk in bytes, followed by the actual data. The data itself may in some situations and for some file formats be encrypted or otherwise encoded, such as when protected by a particular DRM technology. As indicated, in this example information corresponding to a copy 220 of version A 210a of Item 1 has been stored in the indicated file in the format and data chunks 220a and 220b, and thus a media player program that is capable of playing WAV files will play this version of Item 1 when using this file.

In this example, the use of the WAV format also allows one or more optional chunks 225 to be included in the file, such as a "fact" chunk to include information about compression of the data, a "wavl" chunk to include information about a wave list with multiple data chunks, a "slnt" chunk to indicate a segment of silence for use as part of a wave list, a "cue" chunk to specify one or more sample offsets to indicate audio sections of note, a "plst" chunk to indicate the play order of a series of cue points, and various other optional chunks (e.g., "list", "labl", "ltxt", "note", "smpl" and "inst" chunks, each to optionally store various other types of information). It will be appreciated that other types of file formats than WAV files may use other types of chunks, and may store them in other manners.

In this example, the file 200 being generated also includes a section 230 in which information corresponding to a second distinct copy 230 of Item 1 has been stored, with the second copy corresponding to version B 210b of Item 1. As previously noted, media player software is typically designed to ignore chunks of data in such files that are not recognized (often to reflect standards for particular file formats), such as WAV file chunks using tags that are not among those supported. Accordingly, in this example two chunks 230a and 230b are created, but use tags that are not among the standard WAV chunk tags. For example, tag "cp2f" could be used for chunk 230a to indicate that it is a format chunk for a second copy of the digital media item represented by the file, and tag "cp2d" could be used for chunk 230b to indicate that it is a data chunk for that second copy. Since these chunks would not be recognized by standard media player software, however, this second copy of Item 1 would not be played from this file 200 by such standard media player software. As indicated, the file 200 can also optionally include one or more additional chunks 235, such as to store information for one or more other copies of other versions of Item 1 and/or to otherwise store other information encoded by the digital media platform software in the file for use with the described techniques. Alternatively, in some embodiments all of copy 230 may instead be stored in a single chunk rather than in separate format and data chunks 230a and 230b, such as a single chunk that includes all of the data to represent a distinct second file for that version of Item 1 (e.g., by storing not just a format and data chunk within the single chunk, but also an additional header chunk with appropriate information and optionally one or more other chunks).

Once the file 200 is created, it can be provided to the consumer in a variety of ways, such as by electronically transferring the file to one or more computing devices of the consumer (e.g., via download and/or streaming, and whether at the request or instruction of the consumer or instead in an automatic manner, such as transparently to the consumer). As previously noted, standard digital media player software may be able to recognize and play the copy 220 of Item 1 from the file 200, but may not be able to recognize and play other copies such as copy 230 from the file. In order to facilitate use of other copies, in at least some embodiments one or more computing devices of the consumer may be able to employ software provided by the digital media platform (e.g., an applet or other downloadable software) to facilitate extraction of the copies of Item 1 from the file 200 and make them available for use, as well as to facilitate distribution of the extracted copies to one or more computing devices of the consumer (e.g., to devices other than the device on which the copies are extracted). For example, in some embodiments the facilitator software will recognize the one or more chunks in the file that are non-standard chunks added by the digital media platform, and will use the information from those chunks to create new distinct files for each of the copies that will later be playable by standard media player software—this extraction process is made particularly easy in embodiments in which a single chunk in the file 200 includes all information to represent a new file, as discussed above, and the created files may then be transferred to other computing devices of the consumer as appropriate. In other embodiments, the facilitator software may instead be integrated with or in communication with media player software, such that the extracted copies are immediately played or otherwise presented, whether instead of or in addition to storage in separate files.

In addition, while in this illustrated example the file 200 contains only the copies of Item 1 appropriate to the consumer to whom the file is made available, in other embodiments a file provided to the consumer may be constructed in other manners, such as to include additional copies of Item 1 (e.g., all available copies) and/or to include other information not specific to Item 1 (e.g., samples of or full copies of other items). If so, the facilitator software made available to a consumer may further include functionality to determine which of the encoded item copies are appropriate for a consumer and/or the circumstances under which to make copies available to the consumer, such as for such facilitator software to extract only copies 220 and 230 of Item 1 for the consumer from a file that also contained version C 210c and version D 210d. Other encoded item copies (whether of Item 1 or of other items) may not be made available to the consumer by the facilitator software, or instead may be made available only under specified circumstances (e.g., by making a sample of an additional item available to the consumer, but not making a full copy of the additional item available unless the consumer provided appropriate payment or otherwise obtained a right to access that full copy).

In addition, while the item copies were in this illustrative example stored in chunks in a file format that supports such chunks, such copies may be stored in other manners in such file formats and/or in other types of file formats, such as in a manner that will be recognizable by appropriate facilitator software from the digital media platform but that may not be recognizable by standard media player software. Moreover, in some manners the data may be stored in the file in such a manner that the file is not usable by standard media player software to play any copies of the item as created, such as if the facilitator software creates new files for each encoded copy of the item and/or modifies the file 200 in some manner to make at least one of the encoded copies usable in the modified file 200.

As previously noted, in at least some embodiments additional types of information may also be stored in such files and may be used by facilitator software in various ways. For example, in some embodiments additional information may be stored in one or more non-standard chunks (or in another manner) regarding additional information needed to use the file, such as information related to DRM licenses (e.g., information regarding how to obtain the licenses, or the actual DRM licenses in a protected format such as to prevent use of the licenses by other than the facilitator software) for one or more of the encoded copies if they are protected by DRM technology. If so, the facilitator software may further be configured to use such additional information in various ways, such as to automatically extract and/or otherwise obtain DRM licenses for one or more of the encoded copies. Similarly, additional encoded information could include information specific to particular computing devices of the consumer, such as to direct the facilitator software to automatically direct extracted copies of particular encoded copies to particular computing devices of the consumer.

Figure 3:
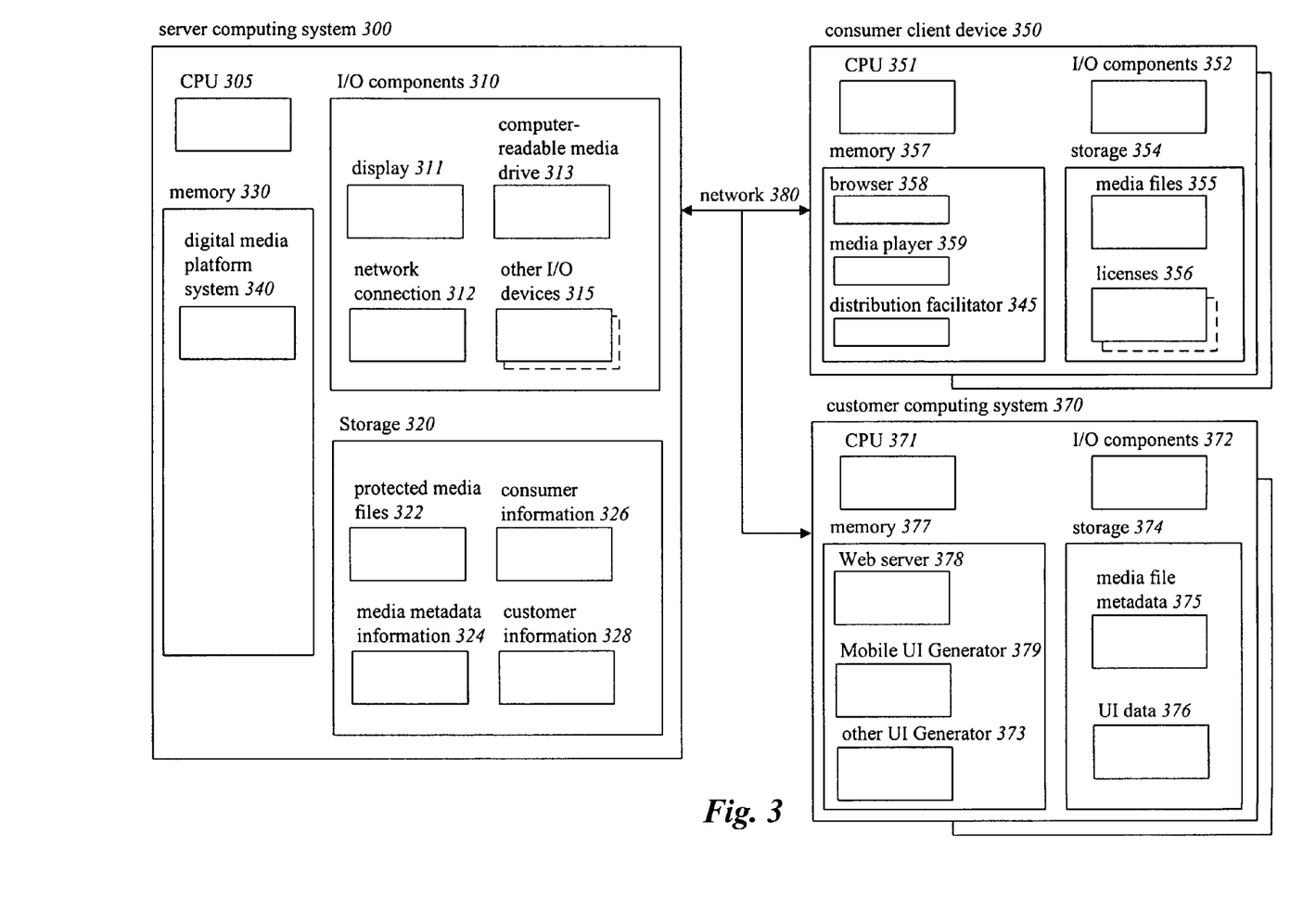
FIG. 3 is a block diagram illustrating an embodiment of a system for performing various interactions between online media stores and consumers' mobile and other devices.

FIG. 3 illustrates a server computing system 300 that is suitable for performing various of the described techniques, such as to support one or more customer computing systems 370 and/or one or more consumer client devices 350 via one or more networks 380. The computing system 300 includes a CPU 305, various input/output ("I/O") components 310, storage 320, and memory 330. The I/O components include a display device 311, a network connection 312, a computer-readable media drive 313, and other I/O devices 315 in this example embodiment, but could include other types of I/O components in other embodiments. Some or all of the consumer client devices may, for example, be mobile devices that have one or more forms of limited capabilities relative to other devices and/or have wireless networking or other communication capabilities.

A digital media platform system 340 is executing in memory 330 in this illustrated embodiment, such as to facilitate various interactions between consumers' client devices and online media stores provided by the customer computing systems and/or to support the customer computing systems in other manners. For example, in some embodiments the digital media platform system may provide functionality to customize interactions with consumer client devices so as to reflect capabilities of those devices (e.g., based on types of information provided via a mobile UI to reflect limited display capabilities, based on a manner of providing downloaded or otherwise provided information to reflect capabilities to playback or otherwise present digital media items, etc.) and/or functionality to synchronize or otherwise coordinate information and actions involving multiple distinct client devices used by a user to interact with one or more of the customer computing systems, whether as functionality provided to customer computing systems for use by their online media stores and/or in a manner provided directly to the consumer client devices. In addition, in some embodiments the digital media platform system may provide functionality to assist in multi-device delivery of digital media items to multiple client devices of consumers, such as by providing to one or more client devices of each such consumer a distribution facilitator component 345 to assist in the multi-device delivery and/or by generating appropriate single files for consumers that each contain multiple copies of a selected digital media item for use by the multiple client devices of a consumer. While not illustrated here, the digital media platform system may further include one or more sub-systems and/or components, such as a mobile UI generator or other UI generator component, a mobile media streaming manager component, and/or a consumer management component.

The digital media platform system may also store and/or use various types of information on storage 320 (e.g., information stored in one or more database data structures), such as consumer information 326, customer information 328, protected or other digital media files 322, and media file metadata information 324 (e.g., for the digital media files), such as to provide some or all such information to online media stores provided by customer computing systems (e.g., when requested by the customer computing systems, or instead on a periodic basis). For example, the user of a consumer client computing device 350 may use a browser 358 executing in memory 357 of the computing device to interact with a Web server 378 executing in memory 377 of an customer computing system 370, such as to obtain information about available digital media files and to purchase or otherwise order such a file. The customer computing system then provides appropriate information to the client computing device in this example to initiate a download request from the client device to the digital media platform system. In this example, the customer computing system may further use one or more components or systems on the customer computing system and/or functionality provided by the digital media platform system so as to customize interactions with consumer client devices so as to reflect capabilities of those devices and/or to synchronize or otherwise coordinate information and actions involving multiple distinct client devices used by a user to interact with one or more of the customer computing systems. For example, the customer computing system may use a Mobile UI Generator component 379 and/or an Other UI Generator component 373 to generate an appropriate UI to a client device so as to reflect a type of the client device and/or capabilities of the client device. In addition, while not shown in this example, one or more copies of a distribution facilitator component may be stored on storage 320 for use in providing the components to consumer devices, while in other embodiments one or more such component copies may instead be available to consumer devices from one or more customer computing systems 370.

When a client device 350 receives a downloaded or otherwise provided digital media file, such as based on interactions with an online media store of a customer computing system, the file is stored with media file information 355 on storage 354 for later use in this example, although in other embodiments a file that is streamed or otherwise sent may be loaded into memory 357 and used without storing the file on storage 354. When the user directs a media player software component 359 that is executing in memory 357 to play the new file, the media player software may use license-related information in the media file to obtain a corresponding license, such as to be stored with license information 356 on storage 354 in this example, and then presents the digital media file to a user of the client device (e.g., via one or more of the I/O components 352 of the client computing device). In addition, in embodiments in which a single file is received that is for use in multi-device delivery of multiple distinct copies of a selected digital media item to multiple client devices of the consumer, a distribution facilitator component 345 executing in memory 357 may operate to facilitate distribution of one or more such copies to other client devices, whether based on directions from the user and/or in an automated manner without such user direction.

It should be appreciated that computing systems and devices 300, 350 and 370 are merely illustrative and are not intended to limit the scope of the present disclosure. For example, computing system 300 may instead be comprised of multiple interacting computing systems or devices, and may be connected to other devices that are not illustrated, including through one or more networks such as the Internet or via the World Wide Web ("Web"). More generally, a "client" or "server" computing system or device may comprise any combination of hardware or software that can interact in the manners described, including (without limitation) desktop or other computers, network devices, PDAs, cellular telephones, cordless phones, devices with walkie-talkie and other push-to-talk capabilities, pagers, electronic organizers, Internet appliances, television-based systems (e.g., using set-top boxes and/or personal/digital video recorders), and various other consumer products that include appropriate inter-communication and computing capabilities. In addition, the functionality provided by the illustrated systems and components in some embodiments may be combined in fewer systems and/or components or may be distributed in additional systems and/or components. Similarly, in some embodiments the functionality of some of the illustrated systems and/or components may not be provided and/or other additional functionality may be available.

It should also be appreciated that, while various elements are illustrated as being stored in memory or on storage while being used, these elements or portions of them can be transferred between memory and other storage devices for purposes of memory management and data integrity, and that these elements or portions of them may in other embodiments be stored in other memory and/or other storage devices, including ones not shown in this example embodiment. Alternatively, in other embodiments some or all of the software components may execute in memory on another device and communicate with the illustrated computing system via inter-computer communication. Some or all of the systems, components or data structures (and/or other contents) may also be stored (e.g., as software instructions or structured data) as contents of a computer-readable medium, such as a hard disk, a memory (e.g. a memory chip), a computer network or cellular wireless network or other data transmission medium, or a portable media article (e.g., a DVD or flash memory device) to be read by an appropriate drive or via an appropriate connection. Some or all of the systems, components and data structures (and/or other contents) can also be transmitted as contents of generated data signals (e.g., by being encoded in a carrier wave or otherwise included as part of an analog or digital propagated signal) on a variety of computer-readable data transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the inventive techniques may be practiced with other computer system configurations.

Figure 4:
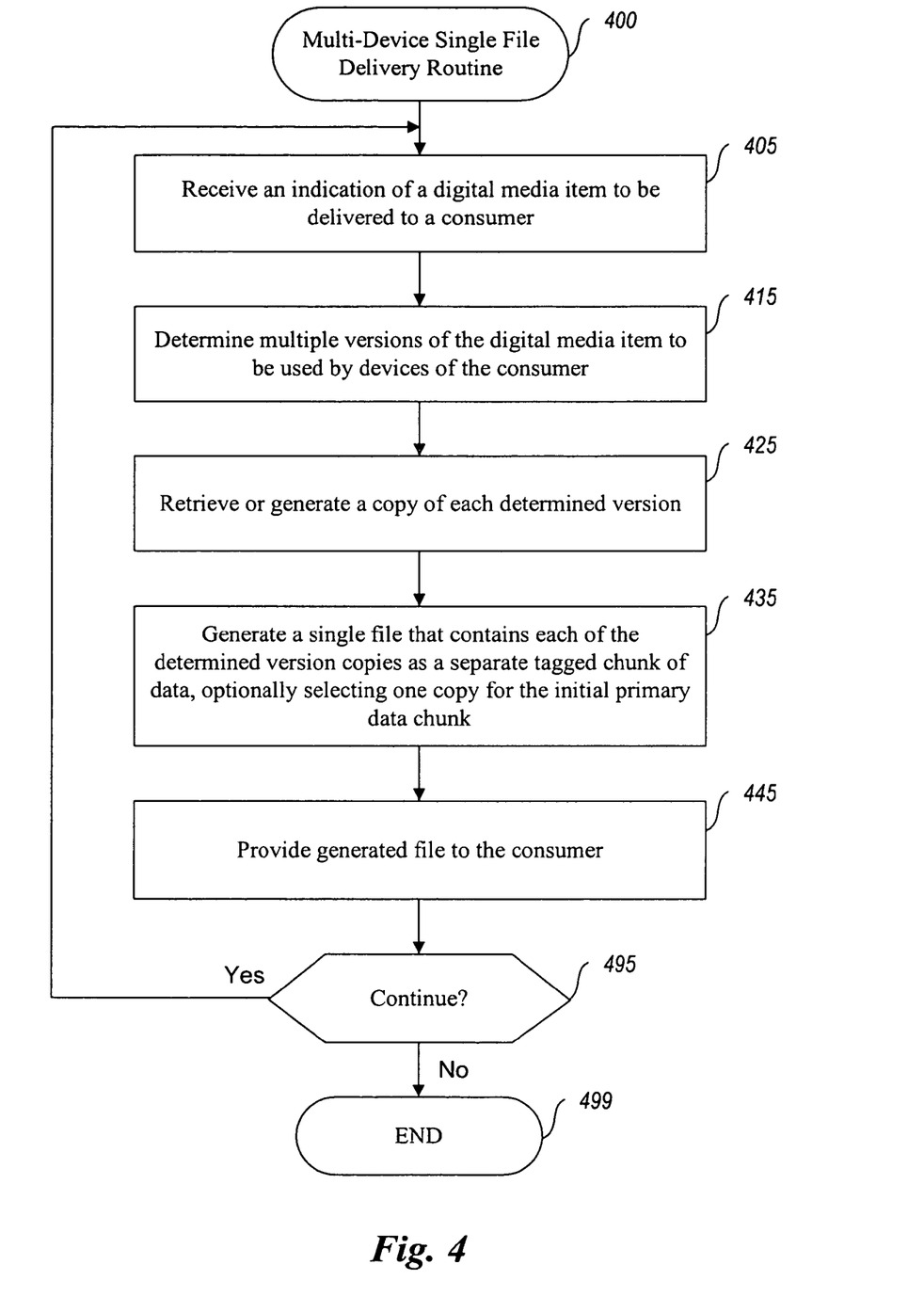
FIG. 4 is a flow diagram of an example embodiment of a Multi-Device Single File Delivery routine.

FIG. 4 is a flow diagram of an embodiment of a Multi-Device Single File Delivery routine 400. The routine may, for example, be provided by execution of part of the digital medial platform system 340 of FIG. 3 and/or by a component executing on a customer computing system for an online media store (not shown). The illustrated embodiment of the routine generates single files for consumers that may have multiple distinct copies of an item for use with multiple distinct devices of a consumers, and provides the generated single file to one or more devices of a consumer as appropriate. As previously discussed, in other embodiments such single files for multi-device use may be generated in other manners and at other times.

The routine begins in step 405, where an indication is received of a digital media item to be delivered to a consumer. In step 410, the routine determines multiple versions of the item to be provided to the consumer, such as multiple versions indicated by the consumer or instead by identifying versions that are appropriate for particular devices of the consumer that will later use the item copies. The routine then retrieves or generates a copy of each determined version of the item (e.g., from storage, if copies of each available version are stored distinctly), and in step 435 generates a single file that contains each of the determined version copies. For example, if the file to be generated is in a file format that supports tagged chunks of data, each version copy may be stored in one or more chunks separate from the chunks used for other version copies, and may further be tagged or otherwise stored in a manner that will allow later identification of those copies (e.g., by facilitator software that will extract those copies). After step 435, the routine continues to step 445 to provide the generated single file to the consumer as appropriate (e.g., by downloading the file upon request of the consumer or automatically), and then continues to step 495 to determine whether to continue. If so, the routine returns to step 405, and if not continues to step 499 and ends. In addition, while the single file is generated before being made available to a consumer in this example embodiment, in other embodiments the generating and/or providing of the single file may be performed in other manners, such as to generate and provide the single file as part of streaming the file to the consumer (e.g., in a simultaneous manner and/or without permanently storing the single file on the computing system on which it is generated).

Figure 5:
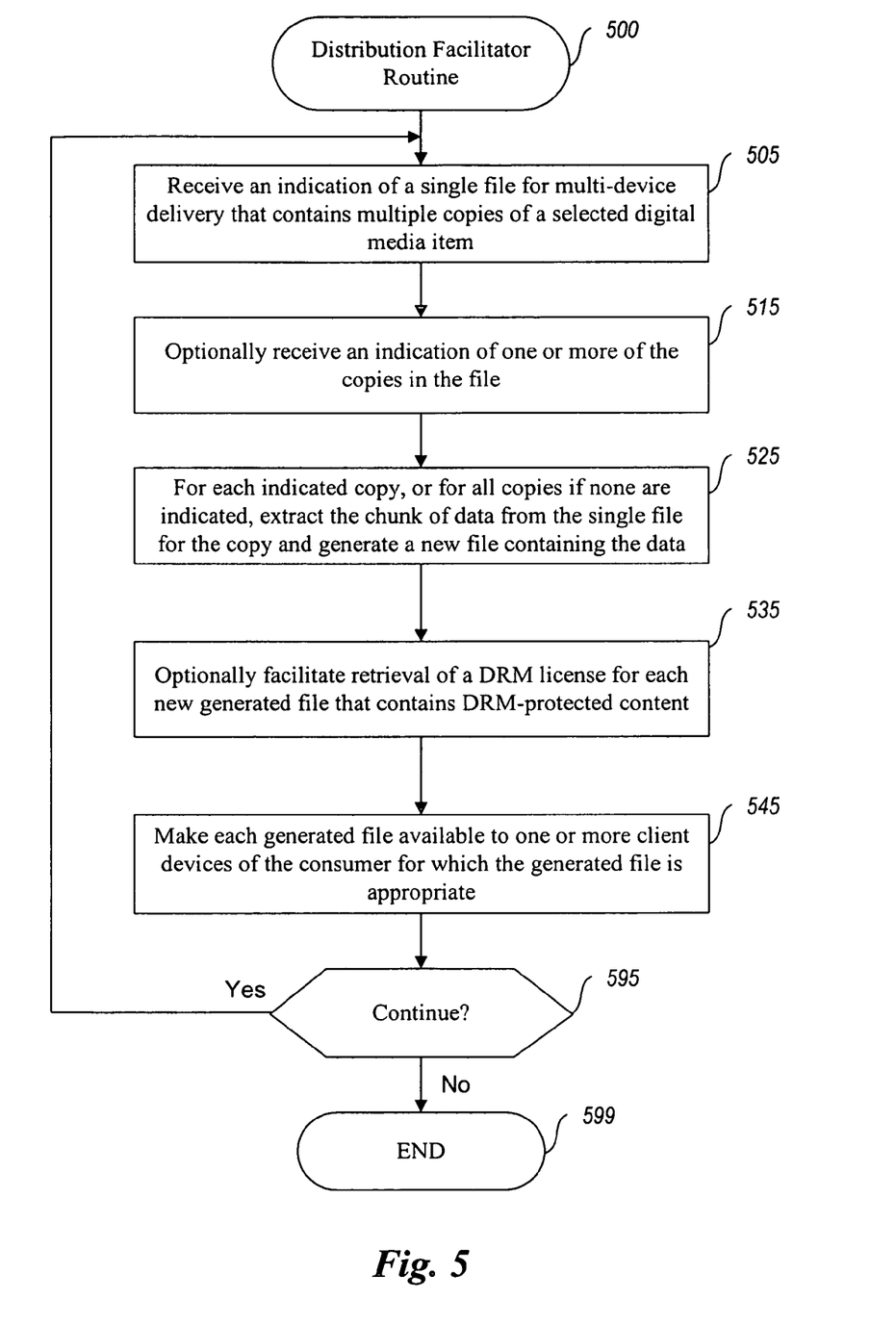
FIG. 5 is a flow diagram of an example embodiment of a Distribution Facilitator routine.

FIG. 5 is a flow diagram of an embodiment of a Facilitator routine 500. The routine may, for example, be provided by execution of the distribution facilitator component 345 of FIG. 3. The illustrated embodiment of the routine processes generated single files on behalf of a consumer in order to extract one or more of multiple distinct copies of an item encoded in the single file, and optionally further facilitates distribution of the extracted copies to one or more devices of the consumer.

The routine begins in step 505, where an indication is received of a received single file for a consumer that includes multiple distinct copies of an item for use by multiple devices of the consumer. In step 515, the routine optionally receives additional information regarding one or more of the copies encoded in the file, such as from the consumer or from the system from which the generated single file was received. The routine then extracts data from the single file in step 525 for each indicated encoded copy, or for all encoded copies if no indications are received (or for all but the first encoded copy if it is encoded in such a manner as to be usable by standard media player software from the single file), and generates a new file for each extracted copy in a file format that is usable by standard media player software (or for particular known or indicated media player software on particular computing devices). In step 535, the routine optionally performs additional actions on behalf of the extracted file copies, whether automatically or based on additional information encoded in the file, such as to obtain DRM licenses for encoded copies that are protected by DRM technology. In step 545, the routine then makes each generated file available to one or more computing devices of the consumer as appropriate, such as upon request of the computing devices and/or consumer, or instead by automatically sending or transferring the files to the appropriate devices. After step 545, the routine then continues to step 595 to determine whether to continue. If so, the routine returns to step 505, and if not continues to step 599 and ends.

It should also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other embodiments the operations may be performed in other orders and in other manners. The data structures discussed above may also be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention.

In addition, while certain aspects of the invention have been discussed in certain forms, the inventors contemplate the various aspects of the invention in any available claim form.

What is claimed is:

1. A method comprising:
   receiving an indication to provide access to a digital media item to a user;
   identifying multiple distinct types of devices that the user may use to access the digital media item;
   automatically generating a single file that comprises multiple distinct copies of the digital media item, the multiple distinct copies to be included being selected based at least in part on the multiple distinct types of devices such that at least a first copy of the included distinct copies is accessible via a first device of the multiple distinct types of devices and such that at least a second copy of the included distinct copies is accessible via a second device of a second of the multiple distinct types of devices; and
   providing the generated single file to a device of the user for use in accessing the digital media item,
   so that a user receives a single file for a digital media item that comprises multiple distinct copies of the digital media item that are accessible from multiple distinct devices,
wherein the included distinct copies are such that the second device cannot be used by the user to access the first copy and such that the first device cannot be used by the user to access the second copy.

2. The method of claim 1 wherein the providing of the generated single file to the user includes streaming the generated single file to at least one device of the user.

3. The method of claim 2 wherein the generating of the single file is performed while the generated single file is being streamed.

4. The method of claim 1 wherein the generated single file includes contents that are protected with digital rights management technology.

5. The method of claim 1 wherein the multiple distinct copies are each one of multiple stored media files whose contents are each protected by being encoded in accordance with digital rights management.

6. The method of claim 1 wherein the multiple distinct copies include at least one of one or more pieces of digital music, one or more digital images, one or more digital videos, and one or more groups of text.

7. The method of claim 1 wherein the received indication is a request received from the user.

8. The method of claim 1 wherein the computing system is part of an online media store that provides generated single files to users in exchange for payment.

9. The method of claim 1 wherein the identifying of the multiple distinct types of devices includes identifying multiple devices of the user that are of multiple types.

10. The method of claim 1 wherein the identifying of the multiple distinct types of devices is based at least in part on information from the received indication.

11. The method of claim 1 wherein the multiple distinct copies include two copies to provide dual delivery of the digital media item to a personal computer and to a portable digital media player device.

12. The method of claim 1 wherein the multiple distinct copies include two copies to provide dual delivery of the digital media item to a personal computer and to a cellular telephone.

13. The method of claim 1 wherein the generating of the single file is performed after the receiving of the indication.

14. The method of claim 1 wherein the generating of the single file includes storing each of the distinct copies as a separate tagged chunk of data.

15. The method of claim 1 wherein the generating of the single file includes storing the first copy in such a manner as to be accessible by standard media player software.

16. The method of claim 1 wherein the generating of the single file includes storing the second copy in such a manner as to be accessible only by a distribution facilitator component.

17. The method of claim 1 further comprising providing a distribution facilitator component to the user to facilitate access to at least some of the included distinct copies.

18. The method of claim 1 wherein the method is performed for each of multiple users so as to automatically generate a distinct single file for each of the users.

19. The method of claim 1 wherein the included distinct copies differ by one or more of data encoding, data format, bit rate, sample rate, Digital Rights Management technology, content, metadata, and compression scheme.

20. The method of claim 1, further comprising:
extracting the first copy from the single file provided to the device; and
sending the first copy to the first device.

21. The method of claim 20, further comprising:
extracting the second copy of the single file provided to the device; and
sending the second copy to the second device.

22. The method of claim 1, wherein prior to providing the generated single file the method further comprises receiving an indication that the user paid a fee for the copies of the digital media item.

23. The method of claim 1, wherein a data format of each of the multiple distinct copies of the digital media item is different and each of the distinct copies is only accessible by a respective device among the multiple distinct types of devices.

24. The method of claim 1, wherein identifying comprises receiving information about each of the multiple distinct types of devices and identifying a distinct copy among the copies that is only accessible by a respective device of the devices based at least in part on the information.

25. The method of claim 1, wherein the device comprises the first device.

26. The method of claim 25, wherein the second device is configured to recognize and execute the second copy but is not able to execute any of the other copies of the multiple distinct copies of the digital media item.

27. The method of claim 1, wherein the first device is configured to recognize and execute the first copy but is not able to execute any of the other copies of the multiple distinct copies of the digital media item.

28. A computer-readable medium whose contents enable a computing device to provide copies of digital media items, by performing the method comprising:
identifying multiple distinct types of devices that a user may use to access a digital media item;
automatically generating a single file that comprises multiple distinct copies of the digital media item, the multiple distinct copies to be included being selected based at least in part on the multiple distinct types of devices such that at least a first copy of the included distinct copies is accessible via a first device of the multiple distinct types and such that at least a second copy of the included distinct copies is accessible via a second device of the multiple distinct types of devices; and
providing the generated single file to a device of one or more users for use in accessing the digital media item,
wherein the included distinct copies are such that the second device cannot be used by the user to access the first copy and such that the first device cannot be used by the user to access the second copy.

29. The computer-readable medium of claim 28 wherein the computer-readable medium is a memory of a computing device.

30. The computer-readable medium of claim 28 wherein the computer-readable medium is a data transmission medium transmitting a generated data signal containing the contents.

31. The computer-readable medium of claim 28 wherein the contents are instructions that when executed cause the computing device to perform the method.

32. The computer-readable medium of claim 28, wherein a data format of each of the multiple distinct copies of the digital media item is different and each of the distinct copies is only accessible by a respective device among the multiple distinct types of devices.

33. The computer-readable medium of claim 28, wherein identifying comprises receiving information about each of the multiple distinct types of devices and identifying a distinct copy among the copies that is only accessible by a respective device of the devices based at least in part on the information.

34. A computing system comprising:
a memory; and
one or more components configured to include software instructions that, when executed in the memory, distribute copies of digital media items under control of the computing system, by:
receiving an indication to provide access to a digital media item to a user;
identifying multiple distinct types of devices that the user may use to access the digital media item;
automatically generating a single file comprises multiple distinct copies of the digital media item, the multiple distinct copies to be included being selected based at least in part on the multiple distinct types of devices such that at least a first copy of the included distinct copies is accessible via a first device of the multiple distinct types and such that at least a second copy of the included distinct copies is accessible via a second device of the multiple distinct types of devices; and
providing the generated single file to a device of the user for use in accessing the digital media item,
wherein the included distinct copies are such that the second device cannot be used by the user to access the first copy and such that the first device cannot be used by the user to access the second copy.

35. The computing system of claim 34 wherein the one or more components are each software components.

36. The computing system of claim 34 wherein the one or more components consist of a means for distributing copies of digital media items under control of the computing system, by:
receiving an indication to provide access to a digital media item to a user;
identifying multiple distinct types of devices that the user may use to access the digital media item;
automatically generating a single file that includes multiple distinct copies of the digital media item, the multiple distinct copies to be included being selected based at least in part on the multiple distinct types of devices such that at least a first of the included distinct copies is accessible via a first device of a first of the multiple distinct types and such that at least a second of the included distinct copies is accessible via a second device of a second of the multiple distinct types; and making the generated single file available to the user for use in accessing the digital media item.

37. The computing system of claim 34, wherein a data format of each of the multiple distinct copies of the digital media item is different and each of the distinct copies is only accessible by a respective device among the multiple distinct types of devices.

38. The computing system of claim 34, wherein identifying comprises receiving information about each of the multiple distinct types of devices and identifying a distinct copy among the copies that is only accessible by a respective device of the devices based at least in part on the information.

39. An apparatus comprising a processing configured to:
receive an indication to provide access to a digital media item to a user;
identify multiple distinct types of devices that the user may use to access the digital media item;
automatically generate a single file that comprises multiple distinct copies of the digital media item, the multiple distinct copies to be included being selected based at least in part on the multiple distinct types of devices such that at least a first copy of the included distinct copies is accessible via a first device of the multiple distinct device types and such that at least a second copy of the included distinct copies is accessible via a second device of the multiple distinct types of devices; and
provide the generated single file to a device of the user for use in accessing the digital media item, wherein the included distinct copies are such that the second device cannot be used by the user to access the first copy and such that the first device cannot be used by the user to access the second copy.

40. The apparatus of claim 39, wherein the processing is further configured to extract at least one of the first or second copy included in the multiple distinct copies of the single file and generate another file that is provided to a respective device among the devices.

41. The apparatus of claim 39, wherein a data format of each of the multiple distinct copies of the digital media item is different and each of the distinct copies is only accessible by a respective device among the multiple distinct types of devices.

42. The apparatus of claim 39, wherein identifying comprises receiving information about each of the multiple distinct types of devices and identifying a distinct copy among the copies that is only accessible by a respective device of the devices based at least in part on the information.

* * * * *

UNITED STATES PATENT AND TRADEMARK OFFICE
CERTIFICATE OF CORRECTION

| | | |
|---|---|---|
| PATENT NO. | : 7,533,061 B1 | Page 1 of 1 |
| APPLICATION NO. | : 11/333942 | |
| DATED | : May 12, 2009 | |
| INVENTOR(S) | : Cheng et al. | |

It is certified that error appears in the above-identified patent and that said Letters Patent is hereby corrected as shown below:

Column 18,

Line 37, after "file" insert --that--.

Signed and Sealed this

Twelfth Day of January, 2010

David J. Kappos
*Director of the United States Patent and Trademark Office*